United States Patent [19]

Weder et al.

[11] Patent Number: 5,152,101
[45] Date of Patent: Oct. 6, 1992

[54] FLOWER POT OR FLOWER POT COVER WITH PLEATED BASE

[75] Inventors: Donald E. Weder; Joseph G. Straeter, both of Highland, Ill.

[73] Assignee: Highland Supply Corporation, Highland, Ill.

[21] Appl. No.: 701,546

[22] Filed: May 16, 1991

Related U.S. Application Data

[63] Continuation of Ser. No. 397,114, Aug. 22, 1989, Pat. No. 5,029,412, which is a continuation-in-part of Ser. No. 366,588, Jun. 15, 1989, which is a continuation-in-part of Ser. No. 219,083, Jul. 13, 1988, Pat. No. 4,897,031.

[51] Int. Cl.$^5$ .............................................. A01G 9/02
[52] U.S. Cl. ............................................. 47/72; 47/66
[58] Field of Search .................................... 47/72

[56] References Cited

U.S. PATENT DOCUMENTS

| | | | |
|---|---|---|---|
| 1,697,751 | 1/1929 | Blake | 47/72 |
| 2,209,778 | 7/1940 | Krasowski | 47/72 |
| 2,302,259 | 11/1942 | Rothfuss | 47/72 |
| 2,355,559 | 8/1944 | Renner | 47/72 |
| 2,510,120 | 6/1950 | Leander | 47/72 |
| 4,773,182 | 9/1988 | Weder | 47/72 |

Primary Examiner—Henry E. Raduazo

[57] ABSTRACT

A flower pot or flower pot cover comprising a base and a skirt connected to an upper end of the base. The base includes a plurality of overlapping folds for providing structural integrity. An upper portion of the overlapping folds in the base are unconnected and a lower portion of the overlapping folds in the base are unconnected. A mid-portion of the overlapping folds in the base, between the upper portion and the lower portion are permanently connected.

6 Claims, 1 Drawing Sheet

FLOWER POT OR FLOWER POT COVER WITH PLEATED BASE

CROSS REFERENCED TO RELATED APPLICATIONS

The present invention is a continuation of patent application entitled "PLEATED FLOWER POT OR FLOWER POT COVER", U.S. Ser. No., 397,114, filed Aug. 22, 1989, which is a continuation-in-part of U.S. Ser. No. 366,588, filed Jun. 15, 1989, entitled "PLEATED FLOWER POT OR FLOWER POT COVER", which is a continuation-in-part of U.S. Ser. No. 219,083, now U.S. Pat. No. 4,897,031, issued Jan. 30, 1990, entitled "ARTICLE FORMING SYSTEM". The present invention also is related to File No. 8400.345, entitled "FLOWER POT OR FLOWER POT COVER WITH BASE HAVING OVERLAPPING FOLD SOME OF WHICH ARE CONNECTED AND SOME OF WHICH ARE UNCONNECTED".

FIELD OF THE INVENTION

The present invention relates to flower pot covers or flower pots having skirts with folds in the skirt and a base with folds in the base wherein the folds in the base are selectively connected.

DESCRIPTION OF THE PREFERRED EMBODIMENTS

Figure 1:
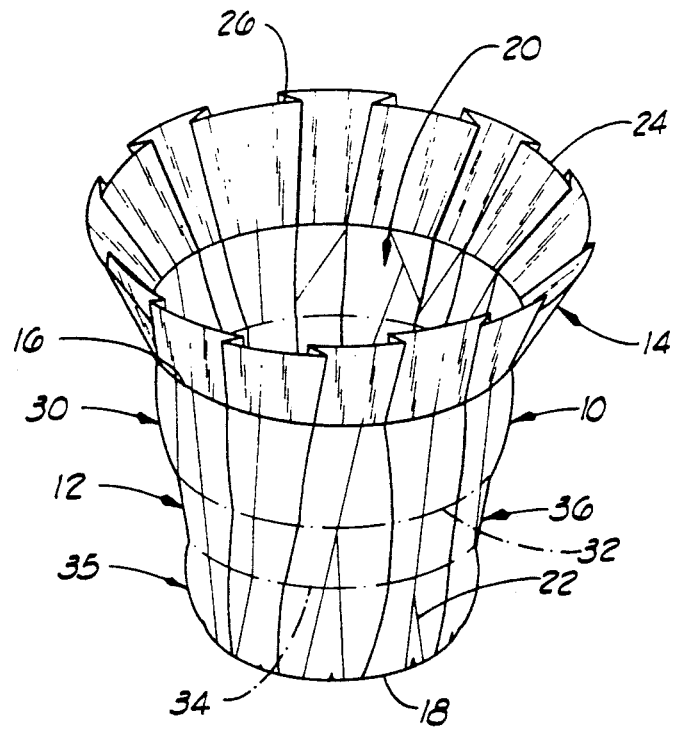
FIG. 1 is a partial perspective view of the flower pot or flower pot cover constructed in accordance with the present invention.
Figure 2:
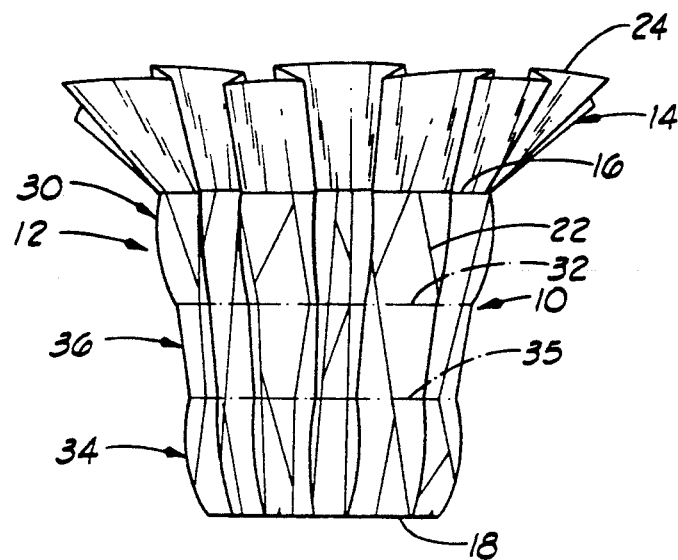
FIG. 2 is a side elevational view of the flower pot or flower pot cover of FIG. 1.

Shown in FIGS. 1 and 2 and designated therein by the reference numeral 10 is a flower pot or flower pot cover constructed in accordance with the present invention. In one embodiment, the article shown in the drawings is a flower pot cover which adapted for providing a decorative cover for a flower pot. In one other embodiment, the article shown in the drawings is a flower pot which is adapted to support floral groupings (defined below) in soil in a manner well known in the art.

The flower pot or flower pot cover 10 comprises a base 12 and a skirt 14.

The base 12 has an upper end 16 and a lower end 18. An object opening 20 (FIG. 1) is formed through the upper end 16 and the object opening 20 extends a distance through the base 12 with the base 12 substantially encompassing the object opening 20 except for the open upper end 16 of the base 12. The object opening 20 is the space substantially encompassed by the base 12.

The base 12 has a plurality of overlapping folds 22 (only one of the overlapping fold 22 being specifically designated by a reference numeral in FIGS. 1 and 2) which extend at various angles and which have different and various lengths. At least some of the overlapping folds 22 are substantially fixed or connected. The overlapping folds 22 cooperate to provide structural integrity for maintaining the preformed shape of the base 12.

The skirt 14 is connected to the upper end 16 of the base 12. Preferably, the skirt 14 is formed integrally with the base 12. The skirt 14 extends outwardly from the upper end 16 of the base 12 terminating with an outer peripheral surface 24. A plurality of folds 26 (only one of the folds 26 being designated with a reference numeral in FIGS. 1 and 2) are formed in the skirt 14. Each of the folds 26 extends generally from the upper end 16 of the base 12 outwardly toward the outer peripheral surface 24 of the skirt 14. A substantial portion of the folds 26 are unconnected or unsealed to provide an overall pleated appearance to the flower pot cover or flower pot 10.

The flower pot or flower pot cover 10 is formed by taking a sheet of material and disposing the sheet of material between a male and female mold. When the molds are brought together in mating engagement with the sheet of material therebetween the overlapping folds 22 are formed. The folds 22 can be substantially permanently connected or fixed by heat sealing the overlapping folds 22, or adhesively connecting the overlapping folds 22.

In a preferred form, the flower pot or flower pot cover 10 is preformed from a sheet of material in a manner substantially like that described in the patent entitled "Article Forming System", U.S. Pat. No. 4,773,182, issued on Sep. 27, 1988 and in patent entitled "Article Forming System", U.S. Pat. No. 4,897,031, issued on Jan. 30, 1990, referred to before. The disclosure in U.S. Pat. No. 4,773,182, specifically is incorporated herein by reference.

The flower pot or flower pot cover 10 may be constructed of a material selected from a group of materials consisting of a man-made organic polymer film, paper (treated or untreated or combinations thereof), burlap, cloth (natural or synthetic or combinations thereof), denim, foil, cling wrap, or cellophane or combinations thereof.

In one preferred embodiment, the flower pot or flower pot cover 10 is constructed from a relatively thin film of substantially non-shape sustaining man-made organic polymer film. The term "man-made organic polymer film" as used herein means a man-made resin such as a polyproplyene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

The flower pot or flower pot cover 10 may be constructed of a single layer of material or a plurality of layers of the same or different types of material. The flower pot or flower pot cover 10 may have any thickness. In one preferred embodiment, the flower pot or flower pot cover 10 is constructed from two polyproplyene films laminated together (a 20"×15" sheet of Mobil 270 ABW white opaque film laminated to a 20"×15" sheet of Mobil 220 AB clear film). The flower pot or flower pot cover 10 preferably has a thickness in a range of from less than about 1.0 mil to about 2.5 mils, although the thickness of the flower pot or flower pot cover 10 may be in a range from less than about 1.0 mil to about 30 mils and preferably the thickness is less than about 6 mils.

The term "cling wrap" as used herein may be any material which is capable of connecting to flower pot 10 and/or itself upon contacting engagement and is wrappable about flower pot 10 whereby portions of the cling wrap contactingly engage and connect to other portions of the cling wrap and/or the flower pot 10 for generally securing the sheet of material 32 wrapped about at least a portion of the flower pot 10. This connecting engagement is generally temporary in that the cling wrap material may be easily removed without tearing same. Preferably the cling wrap material is constructed and treated if necessary, from polyethylene such as Cling Wrap made by Glad®, First Brands Corporation, Danbury, Conn. Generally, the cling wrap material will range in thickness from less than about 0.2 mils to about 10 mils, and preferably less than about 0.5 mils to about 2.5 mils and most preferably from less than about 0.6 mils to about 2 mils. However, any thickness of cling wrap material may be utilized in accordance with the present invention which permits the cling material to function as previously described.

In a preferred form, a decorative pattern is formed or printed or embossed or otherwise disposed on or incorporated in the outer peripheral surface of the flower pot or flower pot cover 10. The term "decorative pattern" as used herein means a color and/or an embossed pattern and/or other decorative surface ornamentation, including, but not limited to printed designs, coatings, flocking or metallic finishes. The flower pot or flower pot cover 10 may be constructed of a sheet of material 40 which is totally or partially clear or tinted transparent material. It also should be noted that a decorative pattern may be incorporated on the interior surface of the base 12 formed by the object opening 20 which may be desired in some applications.

The term "floral grouping" as used herein means cut fresh flowers, artificial flowers, other fresh and/or artificial plants or other floral materials and may include other secondary plants and/or ornamentation which add to the aesthetics of the overall floral grouping.

Changes may be made in the construction of the flower pot or flower pot cover 10 as described herein and changes may be made in the steps or the sequence of steps of the methods described herein without departing from the spirit and scope of the invention as defined in the following claims.

What is claimed is:

1. A flower pot or flower pot cover, comprising:
a base having an upper end and a lower end with an object opening extending through the upper end and having a plurality of overlapping folds formed in the base for cooperating to provide structural integrity to the base, some of the overlapping folds being located in an upper portion of the base a with substantially all of the overlapping folds in the upper portion of the base extending generally between the upper end of the base and a first line extending circumferentially about the base and being spaced a distance from the upper end of the base being unconnected, some of the overlapping folds being located in a lower portion of the base with substantially all of the overlapping folds in the lower portion of the base extending generally between the lower end of the base and a second line spaced a distance from the lower end of the base and extending circumferentially about the base and spaced a distance from the first line being unconnected, and some of the overlapping folds being located in a mid-portion of the base and substantially all of the overlapping folds in the mid-portion of the base extending generally between the first line and the second line being connected.

2. The flower pot or flower pot cover of claim 1 further comprising:
a skirt connected to the upper end of the base and extending a distance outwardly from the upper end of the base terminating with an outer peripheral surface.

3. The flower pot or flower pot cover of claim 2 wherein the base and the skirt each are defined further as having a thickness in a range from less than abut 1.0 mil to about 30 mils.

4. The flower pot or flower pot cover of claim 2 wherein the base and the skirt each are defined further as having a thickness of less than about 6 mils.

5. The flower pot or flower pot cover of claim 1 wherein the folds in the base are shaped to provide an overall pleated appearance.

6. The flower pot or flower pot cover of claim 1 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

* * * * *